(12) United States Patent
Haller

(10) Patent No.: US 11,208,010 B2
(45) Date of Patent: Dec. 28, 2021

(54) VEHICLE SEAT WITH ROTATIONAL ADJUSTMENT DEVICE

(71) Applicant: GRAMMER AG, Ursensollen (DE)

(72) Inventor: Erwin Haller, Birgland (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 17/012,375

(22) Filed: Sep. 4, 2020

(65) Prior Publication Data
US 2021/0070198 A1 Mar. 11, 2021

(30) Foreign Application Priority Data
Sep. 6, 2019 (DE) .......................... 102019123964.8

(51) Int. Cl.
*B60N 2/02* (2006.01)
*B60N 2/14* (2006.01)

(52) U.S. Cl.
CPC ........... *B60N 2/0232* (2013.01); *B60N 2/146* (2013.01); *B60N 2002/022* (2013.01); *B60N 2002/024* (2013.01); *B60N 2002/0236* (2013.01)

(58) Field of Classification Search
CPC ................ B60N 2/0232; B60N 2/146; B60N 2002/022; B60N 2002/0236; B60N 2002/024
USPC ..................................................... 297/344.23
See application file for complete search history.

(56) References Cited

U.S. PATENT DOCUMENTS

| 4,351,562 | A |   | 9/1982 | Twitchell et al. |
|---|---|---|---|---|
| 4,846,529 | A | * | 7/1989 | Tulley .................. B60N 2/0232 297/344.23 |
| 6,572,172 | B1 |   | 6/2003 | Ninomiya et al. |
| 7,036,883 | B1 |   | 5/2006 | Thompson et al. |

(Continued)

FOREIGN PATENT DOCUMENTS

| CA | 2870416 | 5/2016 |
|---|---|---|
| DE | 69930465 | 11/2006 |

(Continued)

OTHER PUBLICATIONS

Official Action for German Patent Application No. 102019123964.8, dated May 13, 2020, 3 pages.

(Continued)

*Primary Examiner* — Mark R Wendell
(74) *Attorney, Agent, or Firm* — Sheridan Ross P.C.

(57) ABSTRACT

The invention relates to a vehicle seat with a lower part for arrangement on a body part of a commercial vehicle and an upper part for storing a seat part, wherein the vehicle seat has a rotational adjustment device, by means of which at least parts of the upper part are rotatable relative to the lower part about an axis in the height direction of the vehicle seat, wherein the rotational adjustment device comprises an electric motor for rotating a rotary plate unit which is rigidly connected to the upper part and is mounted so as to rotate relative to the lower part about the axis, wherein a driveshaft of the electric motor which mechanically interacts with the rotary plate unit is arranged parallel to the width direction of the vehicle seat, wherein, viewed in each case in the height direction of the vehicle seat, an extension of the electric motor and an extension of the rotary plate unit are arranged to be at least partially overlapping.

15 Claims, 9 Drawing Sheets

(56) References Cited

U.S. PATENT DOCUMENTS

| | | | | |
|---|---|---|---|---|
| 7,059,680 | B2* | 6/2006 | Billger | B60N 2/0224 |
| | | | | 297/344.22 |
| 7,121,608 | B2* | 10/2006 | Billger | B60N 2/002 |
| | | | | 296/65.06 |
| 9,415,702 | B2* | 8/2016 | Auger | B60N 2/245 |
| 9,579,995 | B2 | 2/2017 | Haller | |
| 10,195,964 | B2 | 2/2019 | Martin | |

FOREIGN PATENT DOCUMENTS

| | | |
|---|---|---|
| DE | 102007003286 | 7/2008 |
| DE | 102012112523 | 6/2014 |
| DE | 102014201633 | 7/2015 |
| DE | 202017105193 | 9/2018 |
| DE | 102017206941 | 10/2018 |
| DE | 102017112081 | 12/2018 |
| JP | 2002-234368 | 8/2002 |
| WO | WO 2015/066683 | 5/2015 |

OTHER PUBLICATIONS

Official Action for German Patent Application No. 102019123964.8, dated Sep. 14, 2020, 3 pages.
Extended Search Report for European Patent Application No. 20192278.8, dated Feb. 2, 2021, 7 pages.
Official Action for German Patent Application No. 102019123960.5, dated May 18, 2020, 3 pages.
Official Action for German Patent Application No. 102019123960.5, dated Feb. 11, 2021, 5 pages.
Extended European Search Report for European Patent Application No. 20192276.2, dated Feb. 10, 2021, 7 pages.

* cited by examiner

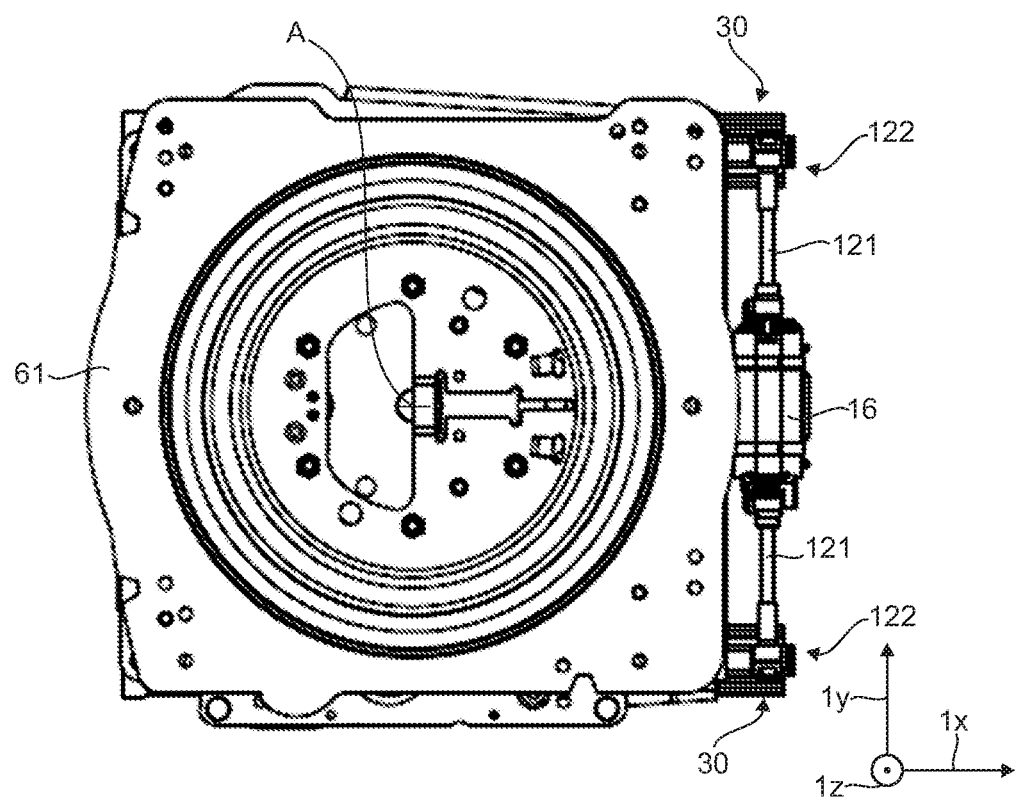
Fig. 2c
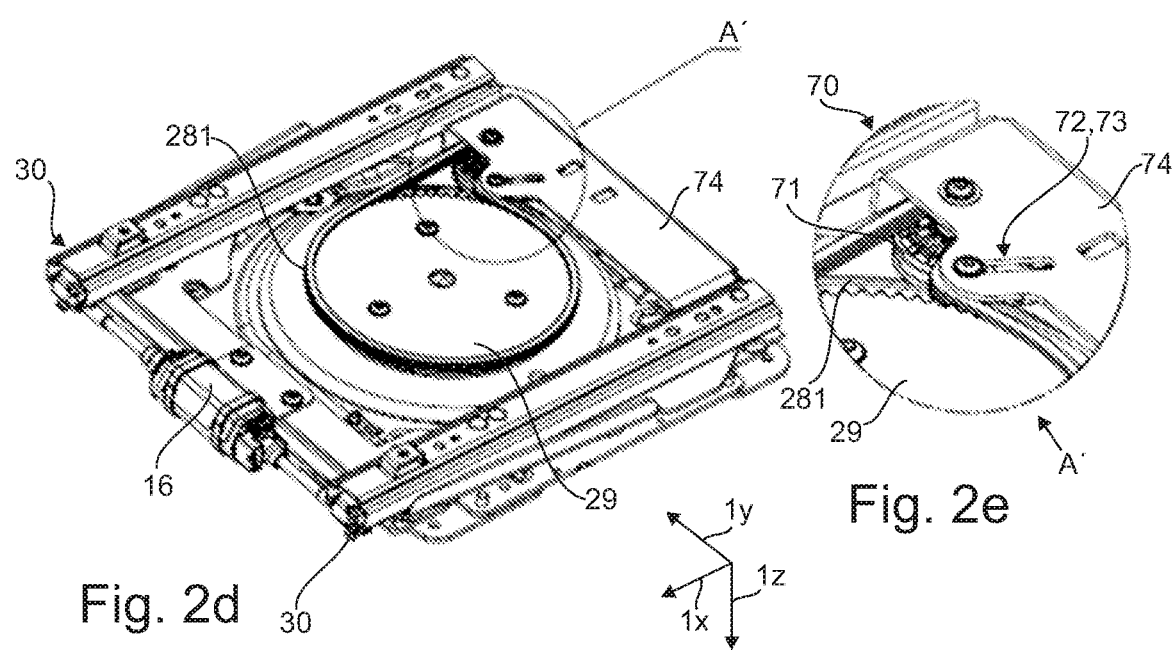
Fig. 2d
Fig. 2e

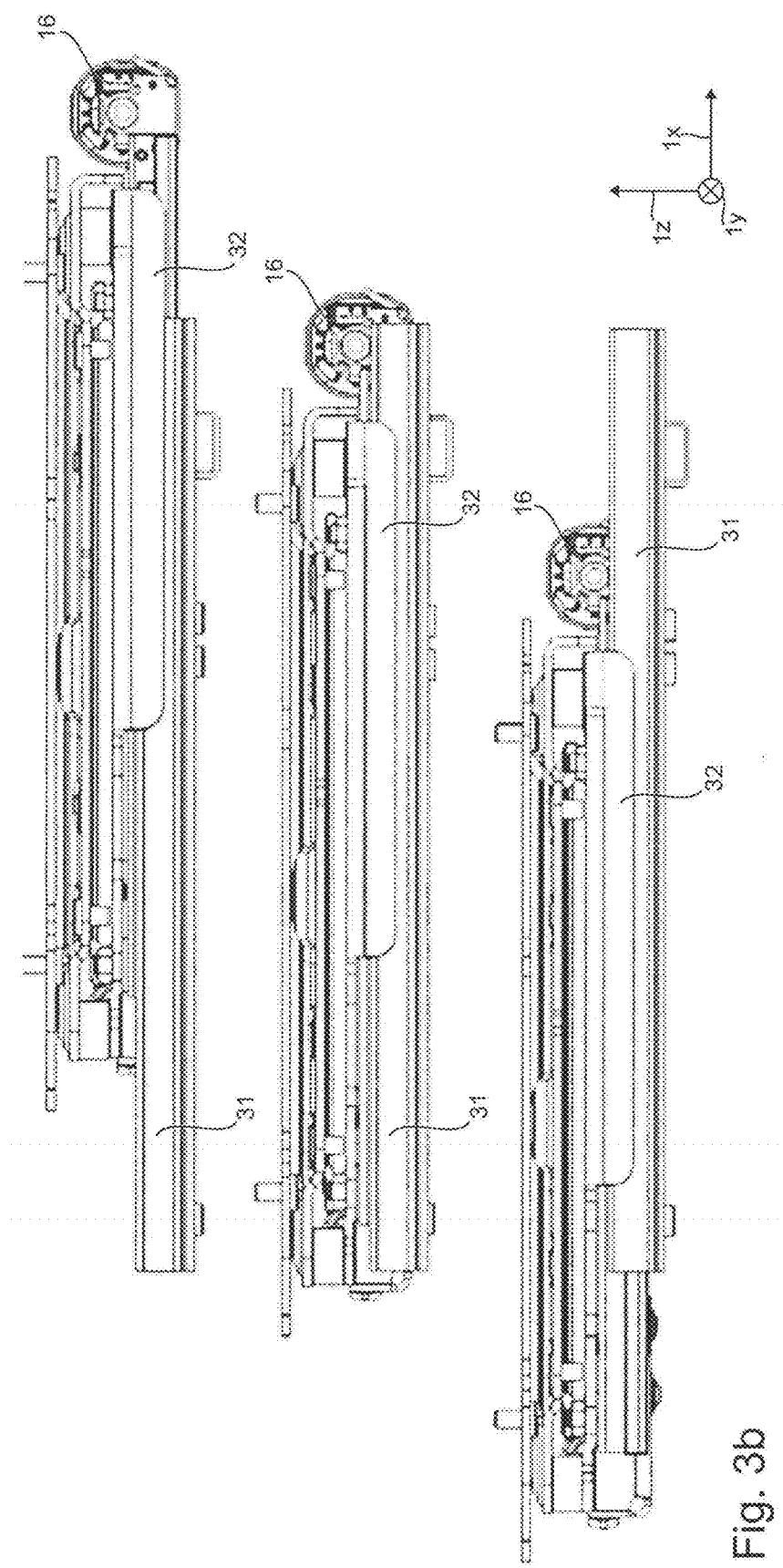

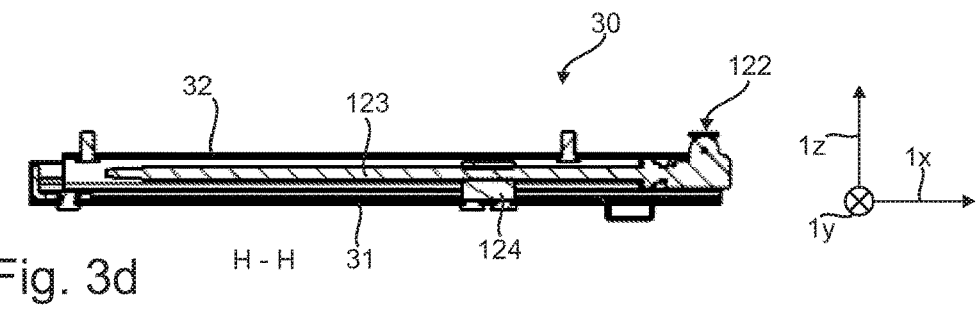
Fig. 3d
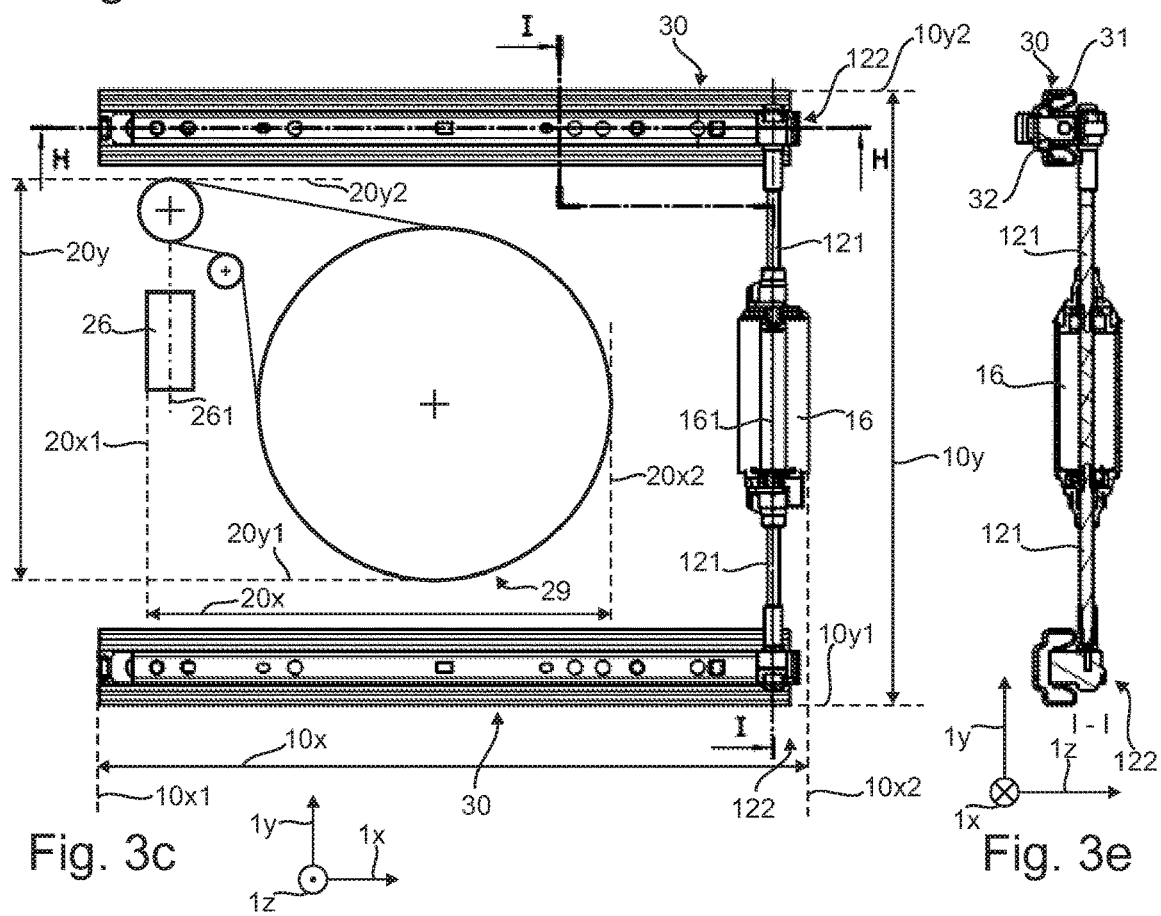
Fig. 3c
Fig. 3e
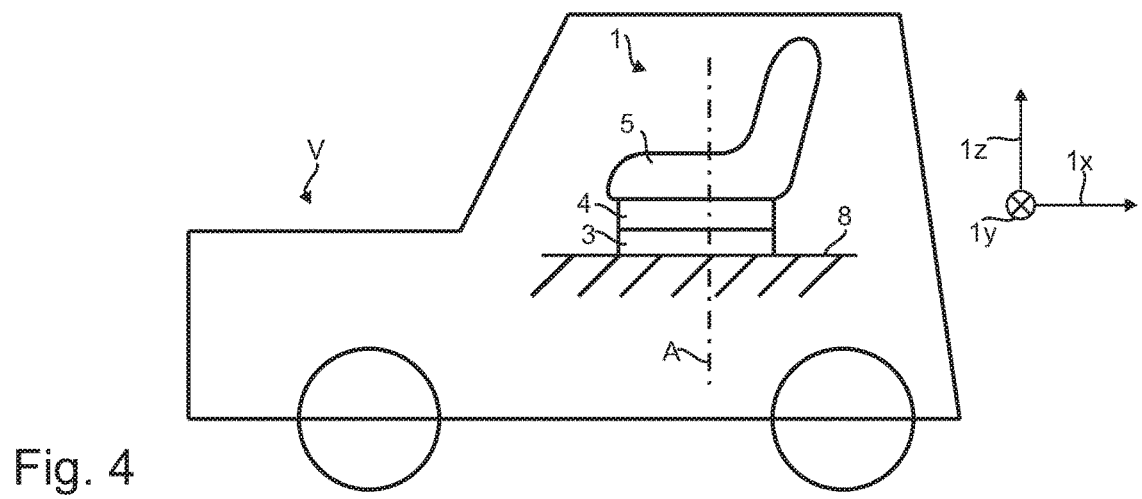
Fig. 4

VEHICLE SEAT WITH ROTATIONAL ADJUSTMENT DEVICE

CROSS-REFERENCE TO RELATED APPLICATION

This application claims the benefit of German Patent Application No. 10 2019 123 964.8 filed Sep. 6, 2019, the entire contents of which are incorporated herein by reference in its entirety.

FIELD

The invention relates to a vehicle seat with a lower part for arrangement on a body part of a commercial vehicle and an upper part for storing a seat part, wherein the vehicle seat has a rotational adjustment device, by means of which at least parts of the upper part are rotatable relative to the lower part about an axis in the height direction of the vehicle seat.

BACKGROUND

Vehicle seats of this type with rotational adjustment devices are already known from the prior art.

For example, locking devices of the rotational adjustment devices are first released manually, whereupon a rotation of the upper part can take place by a movement initiated by the occupant of the vehicle seat. However, such devices are often arranged in the vertical direction of the vehicle seat with a relatively large space requirement. In addition, the driver sometimes finds it troublesome to adjust the seat using their own strength. In addition, precise manual adjustment is only possible with difficulty.

Electric drives are also known as part of rotational adjustment devices. However, these often also have a large space requirement.

SUMMARY

It is therefore an object of the present invention to develop a vehicle seat with a rotational adjustment device, which has a compact design and high accuracy with regard to the adjustment required.

The object of the invention is achieved by a vehicle seat with a lower part for arrangement on a body part of a commercial vehicle and an upper part for storing a seat part, in which case the vehicle seat has a rotational adjustment device by means of which at least parts of the upper part are rotatable relative to the lower part about an axis in the height direction of the vehicle seat, with the rotational adjustment device comprising an electric motor for rotating a rotary plate unit which is rigidly connected to the upper part and is mounted so as to rotate relative to the lower part about the axis, with a drive axle of the electric motor which mechanically interacts with the rotary plate unit being arranged parallel to the width direction of the vehicle seat, whereby, viewed in each case in the height direction of the vehicle seat, an extension of the electric motor and an extension of the rotary plate unit are arranged to be at least partially overlapping.

The rotary plate unit and the electric motor of the rotational adjustment device are thus arranged to be at least partially overlapping in the height direction of the vehicle seat. This greatly reduces the installation space required. In addition, the rotational adjustment device is electrically driven, which eliminates the effort for the seat occupant and increases the accuracy of the desired adjustment.

The rotational adjustment device is preferably designed to be self-retaining. This can be easily achieved using the electric drive. The rotational adjustment device is thus preferably designed without an additional locking device for locking the rotational adjustment device in relation to the rotation of the upper part relative to the lower part about the axis in the height direction.

The vehicle seat preferably comprises a vertical suspension device, by means of which the seat part is resiliently mounted. The longitudinal adjustment device and the rotational adjustment device are preferably arranged below the vertical suspension device or above the vertical suspension device. For example, the longitudinal adjustment device and the rotational adjustment device are arranged between the vertical suspension device and the seat part.

The rotational adjustment device can be activated manually, for example by the driver actuating a release element (control button) on an operating device. In addition, it is possible for the rotational adjustment device to be activated automatically. To this end, it is conceivable that a control system of the vehicle be able to carry out driver recognition and subsequently undertake the preferred settings with regard to the rotational adjustment of the recognized driver ("memory function"). For example, when the vehicle is activated, the detection takes place via the detection of the key, which can be associated with a specific driver. Alternatively, it is possible for the driver to identify themselves to the vehicle; for example, as "driver 1", they can press a corresponding key or select their name ("driver 1") from a menu.

In order to further reduce the space requirement, it is preferred that the electric motor be connected to a front end of the upper part. The electric motor is preferably that part of the rotational adjustment device in which a relationship of the extension in the height direction to an extension in the width direction and/or an extension in the longitudinal direction has the lowest value. In other words, a ratio of a surface enclosing the electric motor to a volume of the electric motor within the enclosing surface is preferably relatively small in comparison to the corresponding ratios of all other parts of the rotational adjustment device. The electric motor is therefore preferably not arranged centrally in the longitudinal direction of the vehicle seat, but rather at the front end of the upper part. This also makes it possible to ensure that heat generated by the electric motor can be dissipated more quickly.

An upper boundary of the rotational adjustment device and/or a lower boundary of the rotational adjustment device is preferably formed by means of the electric motor. A front boundary of the rotational adjustment device is preferably formed by means of the electric motor.

In general, it is advantageous if the rotational adjustment device is designed free of a connection to the lower part and/or contactlessly to the lower part, in order not to hinder the desired relative rotation.

One advantageous configuration of the rotational adjustment device provides for the latter to have a primary gear unit, which is mechanically operatively connected on the drive side to the second electric motor and on the output side to a secondary gear unit, in which case the secondary gear unit is arranged to be mechanically and operatively connected to a rotary plate unit of the rotational adjustment device, which is rotatably mounted with respect to the lower part and rigidly connected to the upper part.

In this case, the primary gear unit comprises, for example, a worm gear unit, which preferably comprises a first worm wheel and a second worm wheel. In this case, the first worm wheel is preferably rigidly connected to the second driveshaft of the second electric motor. The second worm wheel is in engagement with the first worm wheel. The central axis of the second worm wheel is preferably arranged perpendicular to the central axis of the first worm wheel and/or parallel to the height direction of the vehicle seat.

In this case, the secondary gear unit advantageously comprises a self-contained ribbon-shaped force transmission means, which interacts with a circumference of the rotary plate unit, and which can be conveyed in the direction of its circumference by means of the second electric motor.

The ribbon-shaped force transmission means is preferably in engagement with the second worm wheel, such that rotation of the driveshaft of the second electric motor is transmitted via the first worm wheel and the second worm wheel into rotation of the ribbon-shaped force transmission means. For example, for this purpose the second worm wheel is provided with two adjacent functional areas along its central axis, wherein the first functional area has helical teeth and is in engagement with the first worm wheel, and wherein the second functional area is designed to interact with the ribbon-shaped force transmission means. Examples of the second functional area are described in more detail hereinafter.

In the context of the present invention, the term "ribbon-shaped" is understood to be an element, the cross-sectional dimensions of which are small compared to its length. The ribbon-shaped element is preferably designed to be closed in terms of its length.

For example, the rotary plate unit is designed as a chain wheel, and the ribbon-shaped force transmission means is designed as a chain element. According to this variant, a positive interaction between the rotary plate unit and the ribbon-shaped force transmission means is thus formed. As a result, the second functional area of the second worm wheel is also preferably configured in this case as a chain wheel.

A further variant, according to which a non-positive interaction between the rotary plate unit and the ribbon-shaped force transmission means is designed, provides for the rotary plate unit to be designed as a pulley element and the ribbon-shaped force transmission means to be designed as a belt element. For example, the ribbon-shaped force transmission means is designed as a V-belt, or as a poly-V belt, and the rotary plate unit is designed as a pulley designed accordingly to be complementary thereto. As a result, the second functional area of the second worm wheel is also preferably designed in this case as a pulley designed accordingly to be complementary to the ribbon-shaped force transmission means.

It is also conceivable that a positive-fitting belt drive be provided. It is thus possible, for example, for the rotary plate unit to be designed as a toothed pulley element and the ribbon-shaped force transmission means to be designed as a toothed belt element.

In addition to using a ribbon-shaped force transmission means, it would also be conceivable to arrange a gear mechanism between the driveshaft of the electric motor and the rotary plate unit. For this purpose, the rotary plate unit could comprise a rotary plate element in the form of a gearwheel, which is driven by the electric motor via the gear mechanism.

Preferably, the rotational adjustment device further comprises a crown roller bearing unit, which is arranged above the rotary plate unit in the height direction of the vehicle seat. Said crown roller bearing unit preferably comprises an upper cage plate and a lower cage plate, between which roller bearing bodies, for example balls, are arranged.

The upper cage plate is for example part of a first cover plate which closes off the rotational adjustment device upwardly in the height direction. The first cover plate is preferably rigidly connected to the rotary plate unit, such that a rotation of the rotary plate unit is transferred into a rotation of the first cover plate; this is preferably done at a transmission ratio of 1:1.

The lower cage plate is, for example, part of a second cover plate, which is arranged below the first cover plate in the height direction. The second cover plate is preferably designed to be free of mechanical connection to the rotary plate unit, such that rotation of the rotary plate unit is not transferred into rotation of the second cover plate.

In this respect, preferably only parts of the upper part are mounted so as to rotate relative to the lower part by means of the rotational adjustment device. The following are preferably mounted so as to rotate by means of the rotational adjustment device: the upper cover plate, the rotary plate unit, and parts which are arranged, for example, above the upper cover plate in the height direction and which, for example, form the actual seat part with a seat surface and/or backrest. The following are preferably mounted so as not to rotate by means of the rotational adjustment device: the longitudinal adjustment device, the lower cover plate, the primary gear unit, the second electric motor, and/or the secondary gear unit.

It is also preferred if the rotational adjustment device, starting from an initial position, is rotatable by more than 180° in both directions of rotation. It is also preferred if a maximum angle of rotation is freely programmable via the motor control, depending on the driver's wishes.

The rotational adjustment device preferably comprises a tensioning unit, by means of which a pre-tensioning of the ribbon-shaped force transmission means can be adjusted. For example, the tensioning unit comprises an element which is in engagement with the ribbon-shaped force transmission means, the position of said element being adjustable along a guide track. The element is preferably designed as a disc or as a chain wheel. The guide track is preferably formed in a plane which is arranged perpendicular to the height direction of the vehicle seat and/or to the central axis of the second worm wheel. For example, the guide track is provided in the form of a recess in a housing plate. A bearing seat for the second drive motor is preferably also formed by means of this housing plate.

It should be noted that, in the context of the present invention, positional information (for example, front, rear, top, bottom, left, right, etc.) and directional information (height direction, longitudinal direction, width direction) are always defined in relation to the vehicle seat. Global influences, such as a downward slope of a vehicle comprising the vehicle seat and a resulting deflection of the vehicle seat are, on the contrary, not relevant.

BRIEF DESCRIPTION OF THE DRAWINGS

Further advantages, objects, and characteristics of the present invention are explained based on the attached drawings and the following description, in which a vehicle seat is represented and described by way of example with variously embodied guide devices.

The drawings show:

FIGS. 2a, 2b, 2c the view of FIG. 1e in different rotational states of the rotational adjustment device;

FIG. 2d a further perspective view of parts of the vehicle seat according to the invention as per FIG. 1a;

FIG. 2e a detail view of the view according to section A' of FIG. 2d;

FIG. 3b a side view of parts of the vehicle seat according to the invention as per FIG. 1a in different translational states of the longitudinal adjustment device;

FIG. 3c a plan view of the longitudinal adjustment device;

FIGS. 3d, 3e cross-sectional views of FIG. 3c;

FIG. 4 a greatly simplified depiction of a vehicle seat according to the invention.

DETAILED DESCRIPTION

Figure 1A:
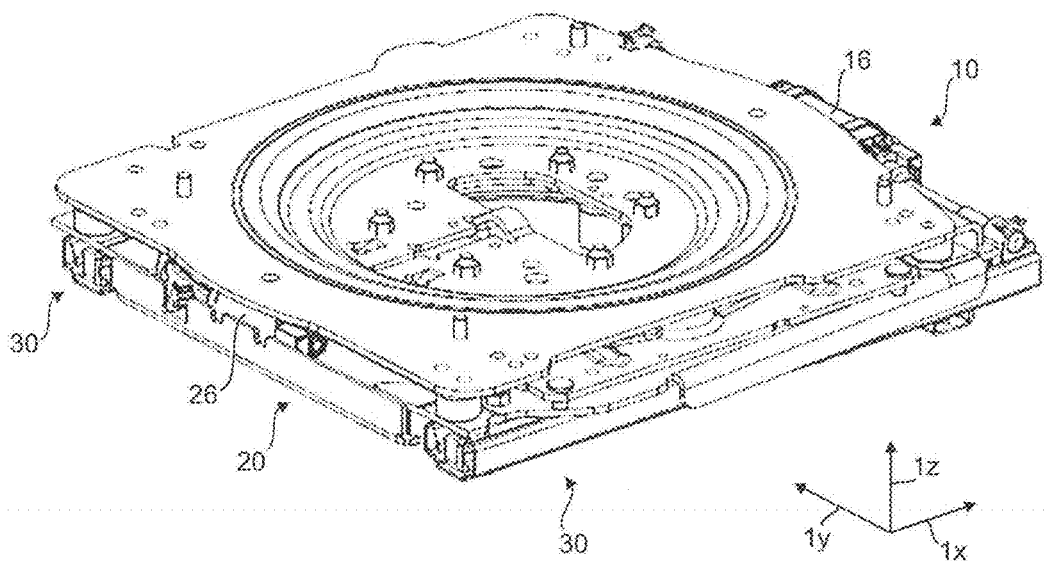
FIG. 1a a perspective view of parts of a vehicle seat according to the invention with a longitudinal adjustment device and a rotational adjustment device.
Figure 1B:
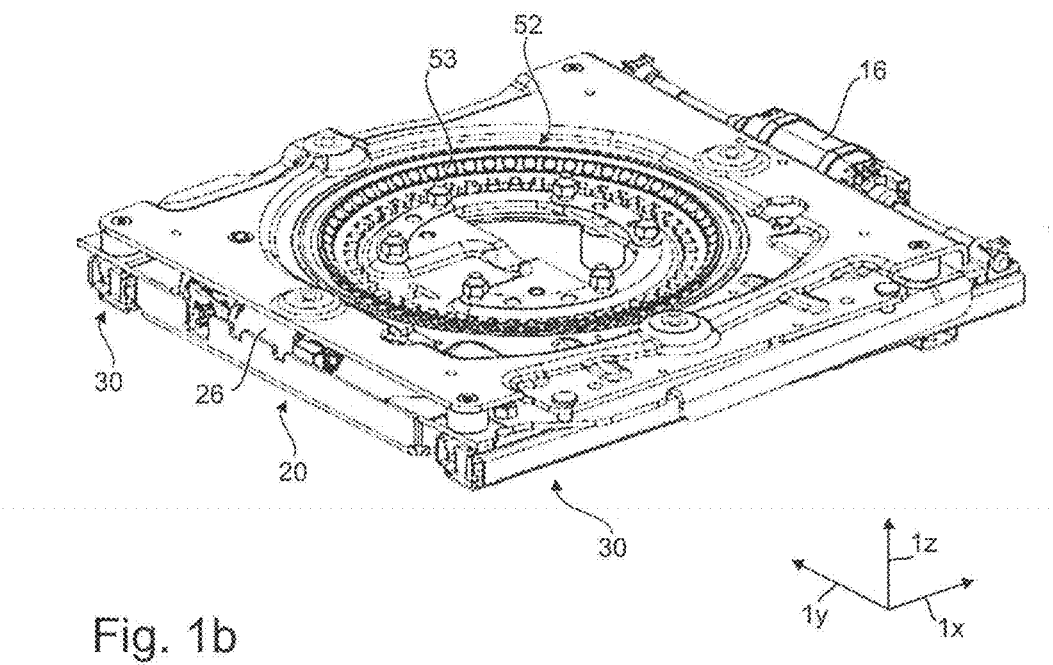
FIG. 1b the view of FIG. 1a without upper cover elements.
Figure 1C:
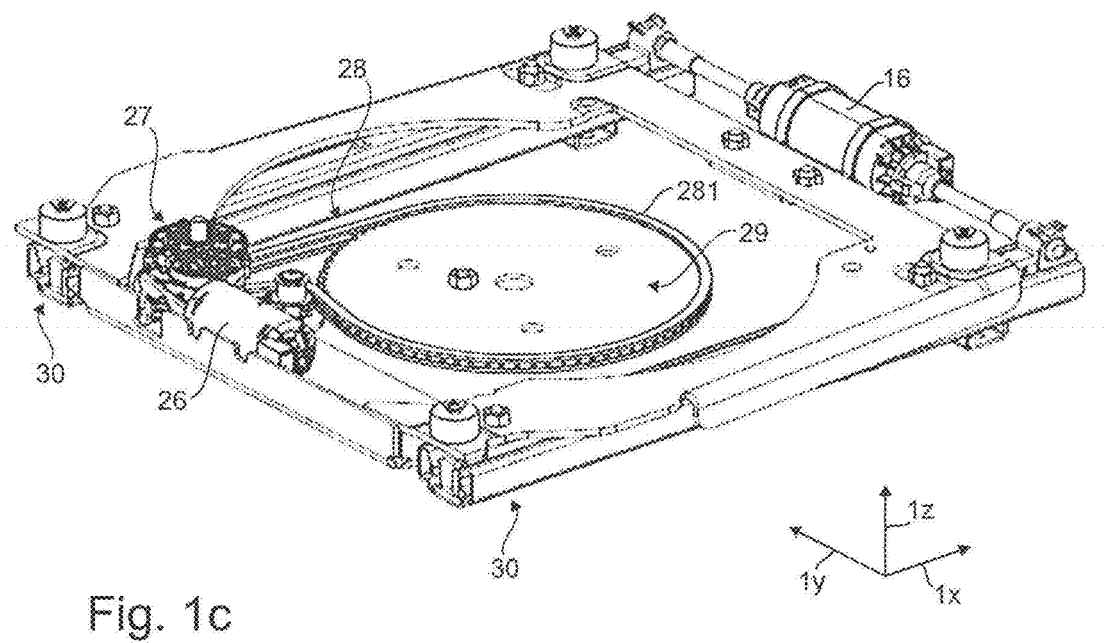
FIG. 1c the view of FIG. 1a with additional hidden elements.

It should be mentioned that, for the sake of clarity, some components are not depicted in some of the figures. Thus, FIGS. 1a, 1b, 1c, 1d, 1e, 1f, 1g, 2a, 2b, 2c, 2d, 2e, 3a, 3b, 3c, 3d, and 3e only show parts of a vehicle seat 1 according to the invention.

It should also be mentioned that a longitudinal adjustment device 10 is shown in the figures and is described below. However, this device works mechanically and electrically independently of the rotational adjustment device 20 and is, therefore, not necessarily part of the vehicle seat 1. Its description therefore only serves to illustrate how the arrangement of the rotational adjustment device could be configured within the vehicle seat 1.

Moreover, the illustrations are each provided with a Cartesian coordinate system, which has the three axes 1x (longitudinal direction of the vehicle seat 1 from front to back corresponding to the direction of the arrow), 1y (width direction of the vehicle seat 1 from left to right corresponding to the direction of the arrow), and 1z (height direction of the vehicle seat 1 from bottom to top corresponding to the direction of the arrow).

FIG. 4 schematically shows a vehicle seat 1 with a lower part 3 for arrangement on a body part 8 of a commercial vehicle V and an upper part 4 for storing a seat part 5. The vehicle seat 1 comprises a longitudinal adjustment device (not shown in FIG. 4; see longitudinal adjustment device 10 in the remaining figures), by means of which the upper part 4 is displaceable relative to the lower part 3 in the longitudinal direction 1x and/or width direction 1y of the vehicle seat 1, and a rotational adjustment device working independently of the longitudinal adjustment device and not shown in FIG. 4 (see rotational adjustment device 20 in the remaining figures), by means of which rotational adjustment device at least parts of the upper part 4 are rotatable relative to the lower part 3 about an axis A in the height direction 1z of the vehicle seat 1.

Furthermore, an imaginary plane E is provided (refer to FIG. 1g), which is arranged intersectingly parallel to a longitudinal direction 1x and a width direction 1y of the vehicle seat 1 as well as the longitudinal adjustment device 10 and the rotational adjustment device 20, in which case the longitudinal adjustment device 10 and the rotational adjustment device 20 are designed to be electrically driven.

The longitudinal adjustment device 10 and the rotational adjustment device 20 are thus arranged to be at least partially overlapping in the height direction 1x of the vehicle seat 1.

It is also shown (see FIG. 1g) that the rotational adjustment device 20 comprises an electric motor 26 for rotating a rotary plate unit 29 which is rigidly connected to the upper part 4 and is mounted so as to rotate relative to the lower part 3 about the axis A, in which case a driveshaft 261 of the electric motor 26 which mechanically interacts with the rotary plate unit 29 is arranged parallel to the width direction 1y of the vehicle seat 1, whereby, viewed in each case in the height direction 1z of the vehicle seat 1, an extension 26z of the electric motor 26 and an extension 29z of the rotary plate unit 29 are arranged to be at least partially overlapping.

In the present case, the rotational adjustment device 20 is designed to be self-retaining, which is implemented by means of the electric drive. Otherwise, the rotational adjustment device 20 is designed without an additional locking device for locking the rotational adjustment device 20 in relation to the rotation of the upper part 4 relative to the lower part 3 about the axis A in the height direction 1z.

FIG. 1 also shows that a first height extension 10z of the longitudinal adjustment device 10 has a first upper boundary 10z1 and a first lower boundary 10z2 in the height direction 1z of the vehicle seat 1, and that a second height extension 20z of parts of the rotational adjustment device 20 has a second upper boundary 20z1 and a second lower boundary 20z2 in the height direction 1z of the vehicle seat 1, whereby, viewed in each case in the height direction 1z of the vehicle seat 1, the first upper boundary 10z1 is arranged above the second upper boundary 20z1, and the first lower boundary 10z2 is arranged below the second lower boundary 20z2.

In the present case, the rotational adjustment device 20 is therefore partially arranged between the two boundaries 10z1, 10z2 of the longitudinal adjustment device 10 in the height direction 1z.

In the present case, the first upper boundary 10z1 and the first lower boundary 10z2 is formed by means of a first electric motor 16. In the present case, the second upper boundary 20z1 and the second lower boundary 20z2 is formed by means of a second electric motor 26. Further elements of the rotational adjustment device 20, which are optionally arranged above the first upper boundary 10z1, are not shown.

FIG. 3c further shows that a first longitudinal extension 10x of the longitudinal adjustment device 10 has a first front boundary 10x1 and a first rear boundary 10x2 in the longitudinal direction 1x of the vehicle seat 1, in which case a second longitudinal extension 20x of parts of the rotational adjustment device 20 has a second front boundary 20x1 and a second rear boundary 20x2 in the longitudinal direction 1x of the vehicle seat 1, whereby, viewed in each case in the longitudinal direction 1x of the vehicle seat 1, the first front boundary 10x1 is arranged in front of the second front boundary 20x1, and the first rear boundary 10x2 is arranged behind the second rear boundary 20x2.

In the present case, the rotational adjustment device 20 is therefore partially arranged between the two boundaries 10x1, 10x2 of the longitudinal adjustment device 10 in the longitudinal direction 1x.

In the present case, the first front boundary 10x1 is formed by means of the two rail units 30, and the first rear boundary 10x2 is formed by means of the first electric motor 16. In the present case, the second front boundary 20x1 is formed by means of the second electric motor 26, and the second rear boundary 20x2 is formed by means of a ribbon-shaped force transmission means 281. Further elements of the rotational adjustment device 20, which are optionally arranged outside a region between the first front boundary 10x1 and the first rear boundary 10x2, are not shown.

FIG. 3c further shows that a first width extension 10y of the longitudinal adjustment device 10 has a first left boundary 10y1 and a first right boundary 10y2 in the width direction 1y of the vehicle seat 1, in which case a second width extension 20y of the rotational adjustment device 20 has a second left boundary 20y1 and a second right boundary 20y2 in the width direction 1y of the vehicle seat 1, whereby, viewed in each case in the width direction 1y of the vehicle seat 1, the first left boundary 10y1 is arranged to the left of the second left boundary 20y1, and the first right boundary 10y2 is arranged to the right of the second right boundary 20y2.

In the present case, the rotational adjustment device 20 is therefore completely arranged between the two boundaries 10y1, 10y2 of the longitudinal adjustment device 10 in the width direction 1y.

In the present case, the first left boundary 10y1 is formed by means of the left rails 30, and the first right boundary 10y2 is formed by means of the right rails 30. In the present case, the second left boundary 20y1 is formed by means of the ribbon-shaped force transmission means 281, and the second right boundary 20y2 is formed by means of a primary gear unit 27.

In the present case, the longitudinal adjustment device 10 comprises a first electric motor 16 for displacing the upper part 4 relative to the lower part 3 in the longitudinal direction 1x of the vehicle seat 1 and the rotational adjustment device 20 comprises a second electric motor 26 for rotating the upper part 4 relative to the lower part 3 about the axis A in the height direction 1z of the vehicle seat 1, in which case a first driveshaft 161 of the first electric motor 16 and a second driveshaft 261 of the second electric motor 26 are arranged parallel to one another and/or parallel to the width direction 1y of the vehicle seat 1 (see FIG. 3c).

The installation space for both electric motors 16, 26, and both the electric motors 16, 26 themselves, are thus arranged spaced apart from one another in the present case. In the present case, the first driveshaft 161 of the first electric motor 16 is arranged perpendicular to the longitudinal extension of the slide rails 32 and the guide rails 31. Mechanical connection of the first electric motor 16 to the slide rails 32 is thus simplified.

Figure 1D:
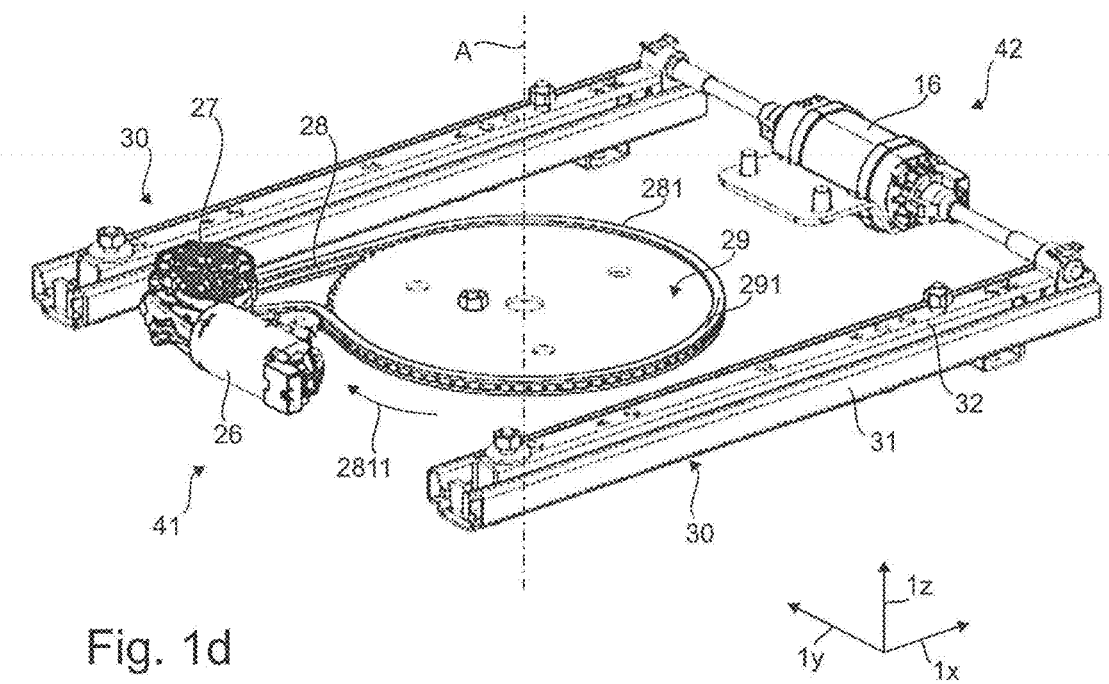
FIG. 1d the view of FIG. 1a with additional hidden elements.

FIG. 1d also shows that the first electric motor 16 is connected to a rear end 42 of the upper part 4, and the second electric motor 26 is connected to a front end 41 of the upper part 4. Said electric motors 16, 26, which require a relatively large installation space, are therefore arranged to be spatially separated from one another and, furthermore, as far apart from one another as possible.

FIG. 3d in particular also shows that the longitudinal adjustment device 10 comprises two rail units 30 arranged in the longitudinal direction 1x and/or width direction 1y, each with a guide rail 31 and a slide rail 32, in which case the guide rails 31 are each connected to the lower part 3, and the slide rails 32 are each connected to the upper part 4. FIG. 3c also shows that, in the present case, by means of the first electric motor 16, which is arranged between the two rail units 30 and is interactively connected to each of the slide rails 32 via a respective gear unit, the slide rail 32 is displaceable in each case relative to the guide rail 31.

FIG. 3b shows, respectively, different states with respect to a longitudinal adjustment of the slide rail 32 relative to the guide rail 31 in the longitudinal direction 1x: from top to bottom, a rear maximum state, a central state, and a front maximum state.

In this case, FIGS. 3c, 3d, and 3e show that each of the gear units comprises the following in the present case: a shaft 121 aligned with the first driveshaft 161 of the first electric motor 16 and operatively connected thereto, and a worm gear unit 122 which is operatively connected on a first side to the shaft 121 and, on a second side, to a spindle element 123 arranged within one of the slide rails 32, with the spindle element 123 being operatively connected to a driver element 124 rigidly connected to one of the guide rails 31.

In general, it is provided in the present case that the rotational adjustment device 20 be designed free of a connection to the lower part 3 and without contact to the lower part 3.

In the present case, FIG. 1d shows, in particular, that the rotational adjustment device 20 has a primary gear unit 27, which is operatively connected on the drive side to the second electric motor 26 and on the output side to a secondary gear unit 28 of the rotational adjustment device 20, in which case the secondary gear unit 28 is arranged operatively connected to a rotary plate unit 29 of the rotational adjustment device 20 which is rotatably mounted with respect to the lower part 3 and rigidly connected to the upper part 4.

Details of the primary gear unit 27 are not shown. In the present case, the primary gear unit 27 comprises a worm gear unit which comprises a first and a second worm wheel. In this case, the first worm wheel is rigidly connected to the second driveshaft 261 of the second electric motor 26. The second worm wheel is in engagement with the first worm wheel, in which case the central axis of the second worm wheel is arranged to be perpendicular to the central axis of the first worm wheel and parallel to the height direction 1z of the vehicle seat 1.

In the present case, the secondary gear unit 28 comprises a self-contained ribbon-shaped force transmission means 281, which interacts with a circumference 291 of the rotary plate unit 29, and which can be conveyed in the direction of its circumference 2811 by means of the second electric motor 26.

In the present case, the ribbon-shaped force transmission means 281 is in engagement with the second worm wheel (not shown) such that rotation of the drive axle 261 of the second electric motor 26 is transmitted via the first worm wheel and the second worm wheel into rotation of the ribbon-shaped force transmission means 281, and into rotation of the rotary plate unit 29. In the present case, for this purpose, the second worm wheel is provided with two adjacent functional areas along its central axis, the first functional area having helical teeth and being in engagement with the first worm wheel, with the second functional area being designed to interact with the ribbon-shaped force transmission means 281.

In the present case, the ribbon-shaped force transmission means 281 is an element, the cross-sectional dimensions of which are small compared to the length. In the present case, it is designed to be closed in terms of its length.

In the present case, the rotary plate unit 29 is designed as a chain wheel, and the ribbon-shaped force transmission means 281 is designed as a chain element or a chain. According to this variant, a positive interaction between the rotary plate unit 29 and the ribbon-shaped force transmission means 281 is thus formed. Thus, in the present case, the second functional area of the second worm wheel is also designed as a chain wheel.

In the present case, the rotational adjustment device 20 further comprises a crown roller bearing unit 50 (refer in particular to FIG. 1f), which is arranged above the rotary plate unit 29 in the height direction 1z of the vehicle seat 1. Said unit preferably comprises an upper cage plate 51 and a lower cage plate 52, between which roller bearing bodies 53, for example balls, are arranged.

Figure 1E:
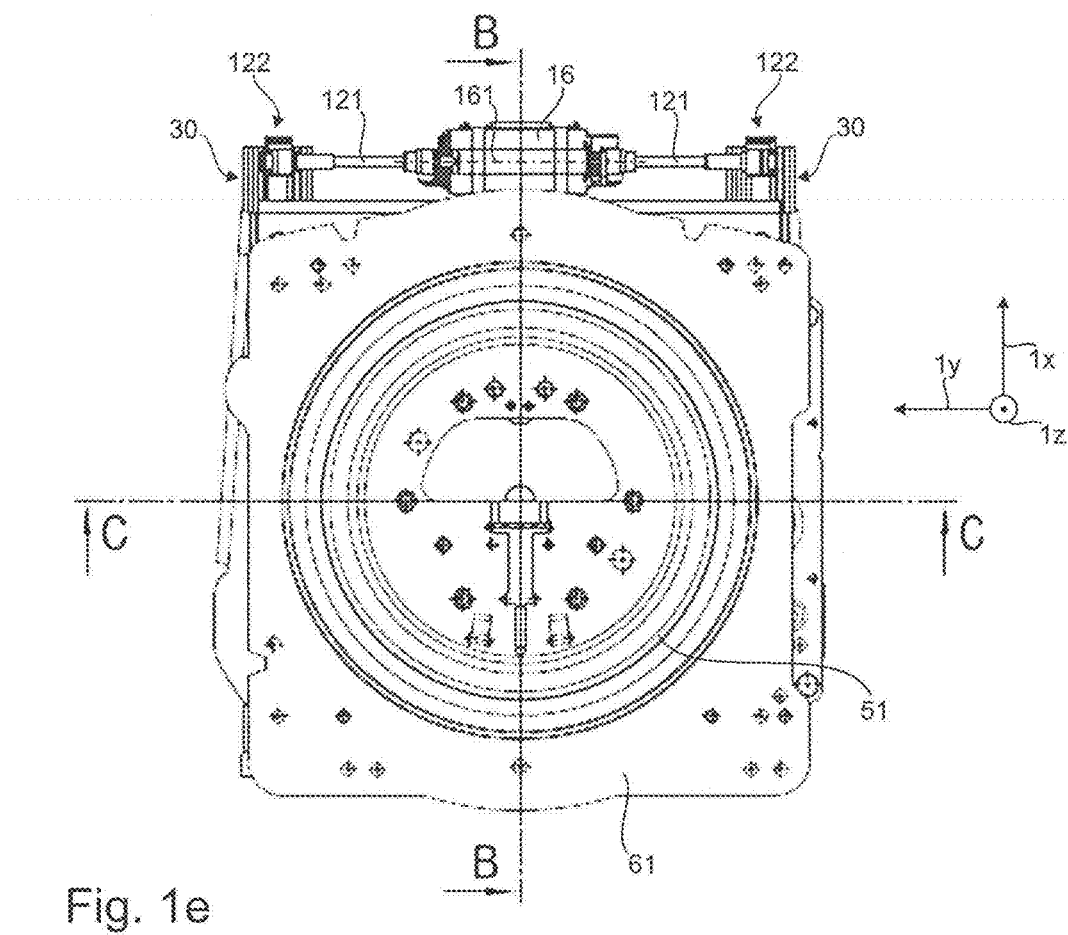
FIG. 1e a plan view of parts of the vehicle seat according to the invention as per FIG. 1.
Figure 1F:
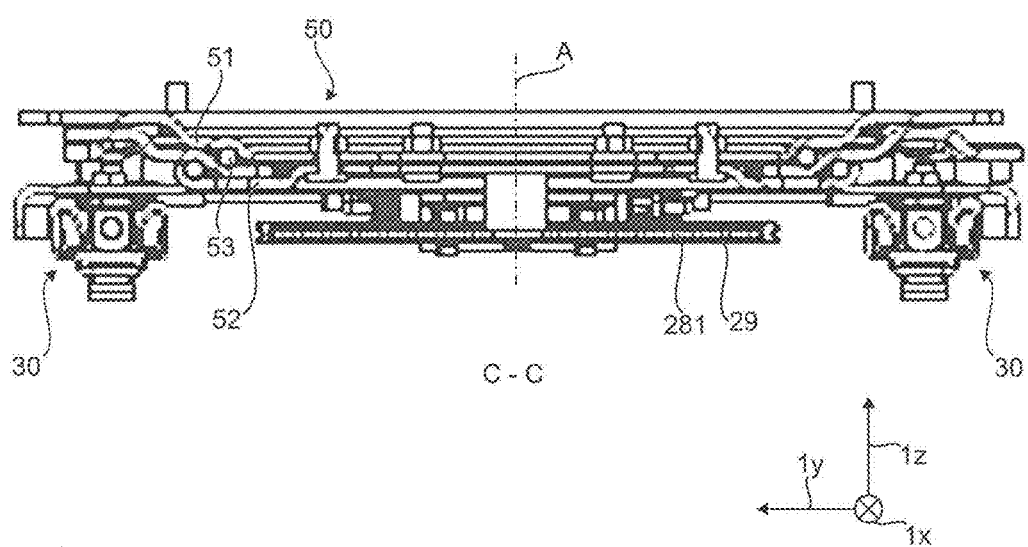
FIG. 1f, 1g cross-sectional views of FIG. 1e.
Figure 1G:
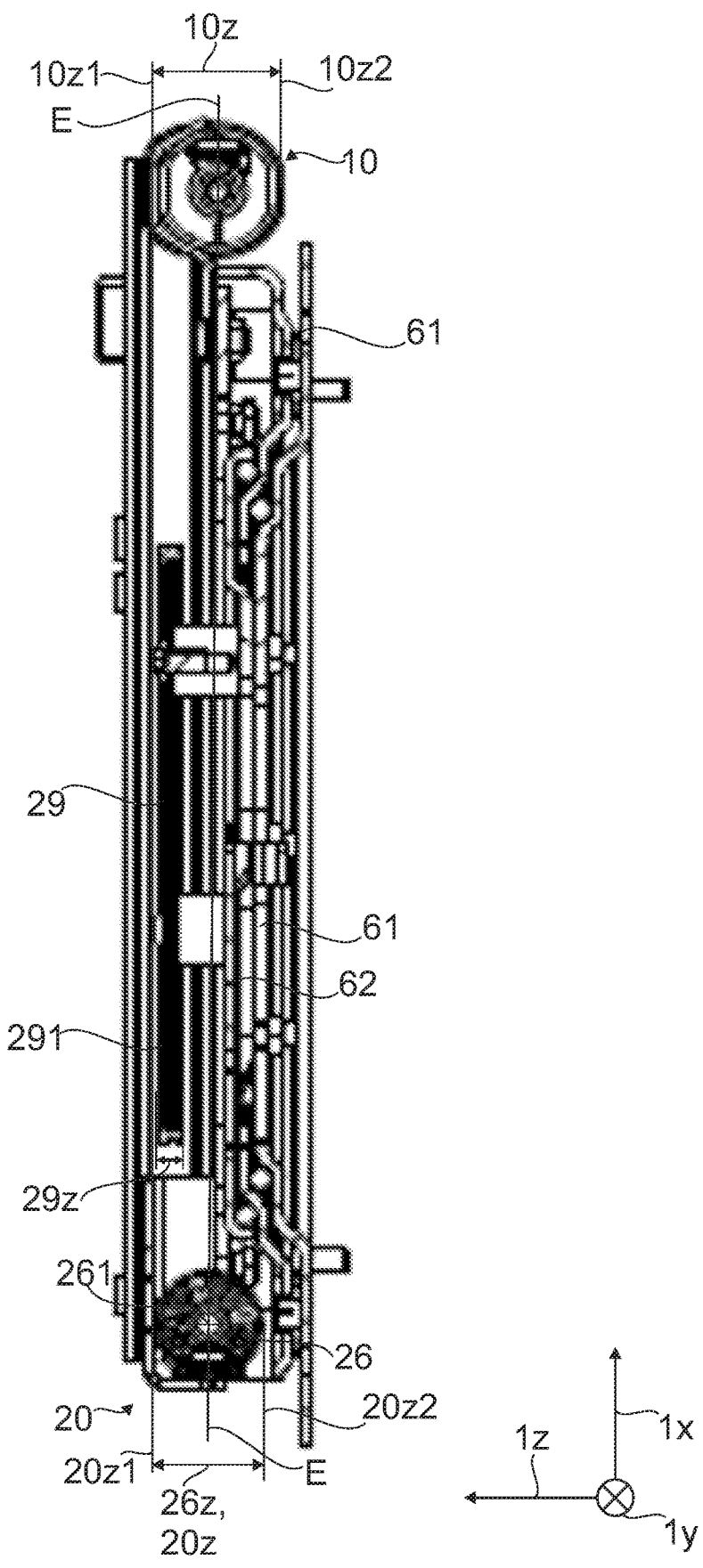
Figure 2A:
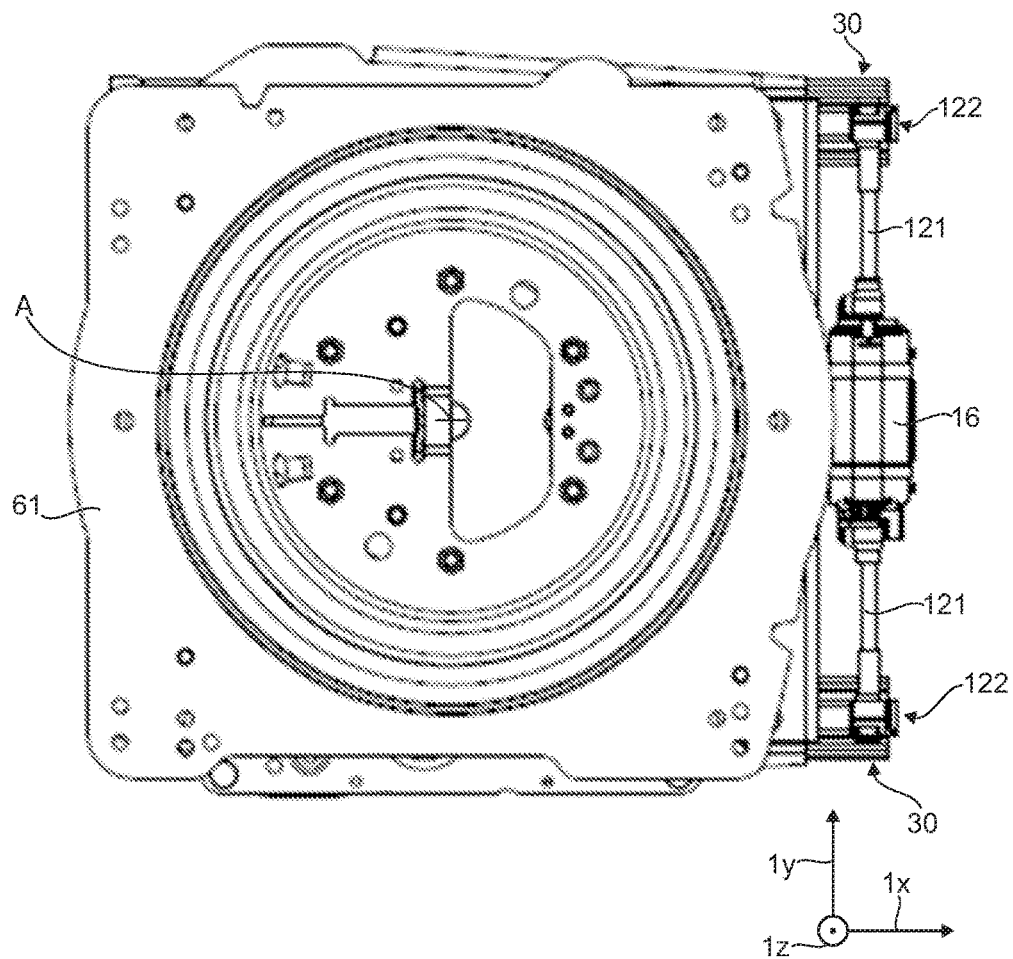
Figure 2B:
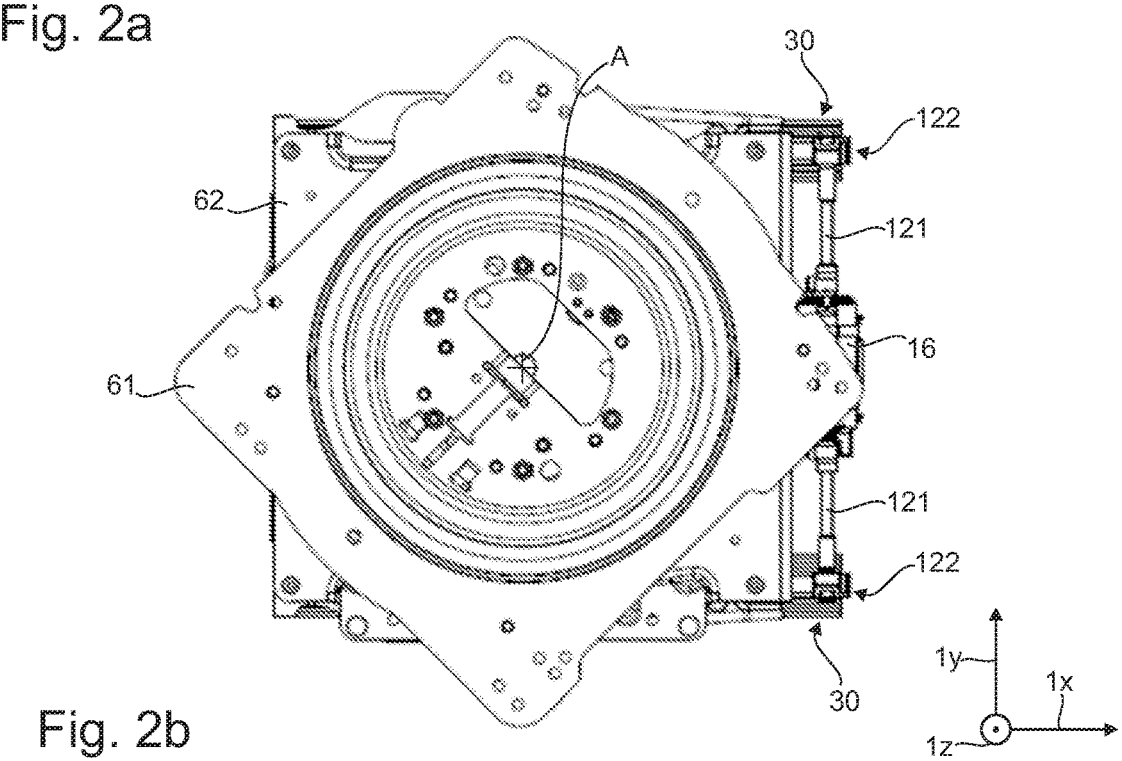
Figure 3A:
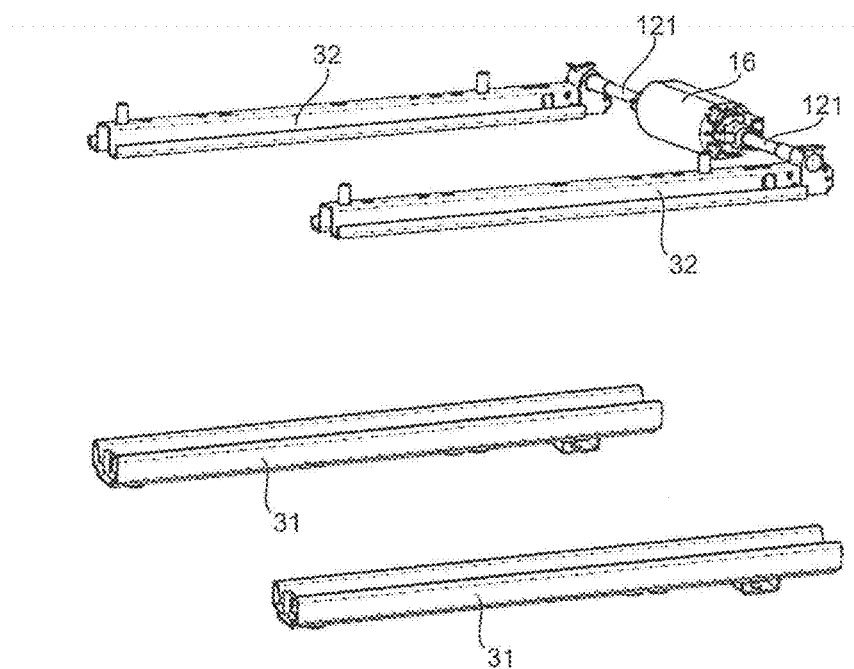
FIG. 3a an exploded perspective view of the longitudinal adjustment device.

In the present case, the upper cage plate 51 is part of a first cover plate 61, which closes off the rotational adjustment device 20 upwardly in the height direction 1z (refer to FIG. 1e). In the present case, the first cover plate 61 is rigidly connected to the rotary plate unit 29 such that rotation of the rotary plate unit 29 is transferred into rotation of the first cover plate 61 at the transmission ratio of 1:1. FIGS. 2a, 2b and 2c herein show different states of rotation of the first cover plate 61.

In the present case, the lower cage plate 52 is part of a second cover plate 62, which is arranged below the first cover plate 61 in the height direction 1z. In the present case, the second cover plate 62 is, with the exception of the roller bearing using the balls 53, designed to be free of mechanical connection to the rotary plate unit 29 such that rotation of the rotary plate unit 29 is not transferred into rotation of the second cover plate 62.

In the present case, the following are mounted so as to rotate by means of the rotational adjustment device 20: the upper cover plate 61, the rotary plate unit 29, and parts which are not shown and are arranged, for example, above the upper cover plate 61 in the height direction 1z and which, for example, form the actual seat part 5 with seat surface and/or backrest. In the present case, the following are preferably mounted so as not to rotate by means of the rotational adjustment device 20: the longitudinal adjustment device 10, the lower cover plate 62, the primary gear unit 27, and the second electric motor 26.

In the present case, the parts of the rotational adjustment device 20 which meet the above conditions with regard to the upper 10z1, 20z1, lower 10z2, 20z2, left 10y1, 20y1, right 10y2, 20y2, front 10x1, 20x1, and rear 10x2, 20x2 boundaries are to be understood in particular to mean the following parts individually or in any combination: the primary gear unit 27, the second electric motor 26, the secondary gear unit 28, and the rotary plate unit 29.

In the present case, the rotational adjustment device 20 comprises a tensioning unit 70, by means of which a pre-tensioning of the ribbon-shaped force transmission means 281 can be adjusted (refer in particular to FIGS. 2d and 2e, each of which shows a view of the rotational adjustment device 20 from below). In the present case, the tensioning unit 70 comprises an element 71, which is in engagement with the ribbon-shaped force transmission means 281, and whose position can be adjusted along a guide track 72. In the present case, the element 71 is designed as a chain wheel. In the present case, the guide track 72 is formed in a plane which is arranged to be perpendicular to the central axis of the second worm wheel (not shown), and thus perpendicular to the height direction 1z. In the present case, the guide track 72 is provided in the form of a recess 73 in a housing plate 74. In the present case, a bearing seat for the second electric motor 26 is also formed by means of this housing plate 74.

It is understood that the embodiments explained hereinabove merely relate to a first configuration of the vehicle seat according to the invention. In this respect, the configuration of the invention is not limited to these embodiments.

All features disclosed in the application documents are claimed as being essential to the invention, provided that they are, individually or in combination, novel over the prior art.

LIST OF REFERENCE SIGNS

1 Vehicle seat
$1x$ Longitudinal direction
$1y$ Width direction
$1z$ Height direction
3 Lower part
4 Upper part
5 Seat part
8 Body part
10 Longitudinal adjustment device
$10x$ First longitudinal extension of the longitudinal adjustment device
$10x1$ First front boundary of the first longitudinal extension
$10x2$ First rear boundary of the first longitudinal extension
$10y$ First width extension of the longitudinal adjustment device
$10y1$ First left boundary of the first width extension
$10y2$ First right boundary of the first width extension
$10z$ First height extension of the longitudinal adjustment device
$10z1$ First upper boundary of the first height extension
$10z2$ First lower boundary of the first height extension
16, 26 Electric motor
$26z$ Extension of the electric motor 26
20 Rotational adjustment device
$20x$ Second longitudinal extension of the rotational adjustment device
$20x1$ Second front boundary of the second longitudinal extension
$20x2$ Second rear boundary of the second longitudinal extension
$20y$ Second width extension of the rotational adjustment device
$20y1$ Second left boundary of the second width extension
$20y2$ Second right boundary of the second width extension
$20z$ Second height extension of the rotational adjustment device
$20z1$ Second upper boundary of the second height extension
$20z2$ Second lower boundary of the second height extension
27 Primary gear unit
28 Secondary gear unit
29 Rotary plate unit
$29z$ Extension of the rotary plate unit
30 Rail unit
31 Guide rail
32 Slide rail
41, 42 End
50 Crown roller bearing unit
51, 52 Cage plate
61, 62 Cover plate
70 Tensioning unit
71 Element
72 Guide track
73 Recess
74 Housing plate
121 Shaft
122 Worm gear unit
123 Spindle element
124 Driver element 161, 261 Driveshaft
281 Ribbon-shaped force transmission means
291, 2811 Circumference
A Axis
E Plane
V Commercial vehicle

What is claimed is:

1. A vehicle seat, comprising:
a lower part for arrangement on a body part of a commercial vehicle;
an upper part for storing a seat part;
a longitudinal adjustment device connected to the upper part and the lower part; and
a rotational adjustment device arranged between the upper part and the lower part,
wherein at least parts of the upper part are rotatable relative to the lower part about an axis in a height direction of the vehicle seat,
wherein the rotational adjustment device comprises an electric motor for rotating a rotary plate unit,
wherein the rotary plate unit is rigidly connected to the upper part and is mounted so as to rotate relative to the lower part about the axis,
wherein the electric motor is moveable along a longitudinal direction of the vehicle seat,
wherein a driveshaft of the electric motor is arranged parallel to a width direction of the vehicle seat, and
wherein the electric motor and the rotary plate unit are intersected by a plane perpendicular to the axis in the height direction of the vehicle seat.

2. The vehicle seat according to claim 1, wherein the electric motor is connected to a front end of the upper part.

3. The vehicle seat according to claim 1, wherein the rotational adjustment device is designed free of a connection to the lower part.

4. The vehicle seat according to claim 1,
wherein the rotational adjustment device has a primary gear unit,
wherein the primary gear unit is mechanically and operatively connected on a drive side to a second electric motor,
wherein the primary gear unit is mechanically and operatively connected on an output side to a secondary gear unit, and
wherein the secondary gear unit is arranged to be mechanically and operatively connected to a rotary plate unit of the rotational adjustment device.

5. The vehicle seat according to claim 4,
wherein the secondary gear unit comprises a self-contained ribbon-shaped force transmission element that interacts with a circumference of the rotary plate unit, and
wherein the electric motor drives the ribbon-shaped force transmission element around the circumference of the rotary plate unit.

6. The vehicle seat according to claim 5, wherein the rotary plate unit is designed as a chain wheel, and wherein the ribbon-shaped force transmission element is designed as a chain element.

7. The vehicle seat according to claim 5, wherein the rotary plate unit is designed as a pulley element, and wherein the ribbon-shaped force transmission element is designed as a belt element.

8. The vehicle seat according to claim 1, wherein the rotational adjustment device, starting from an initial position, is rotatable by more than 180° in a first direction and a second direction of rotation.

9. The vehicle seat according to claim 1,
wherein the rotational adjustment device comprises a tensioning unit, and
wherein the tensioning unit can adjust a pre-tensioning of a ribbon-shaped force transmission element.

10. The vehicle seat according to claim 9,
wherein the tensioning unit comprises an element engaged with the ribbon-shaped force transmission element, and
wherein a position of the element can be adjusted along a guide track.

11. The vehicle seat according to claim 1, wherein the rotational adjustment device is designed without an additional locking device for locking the rotational adjustment device in relation to a rotation of the upper part relative to the lower part about the axis in the height direction.

12. The vehicle seat according to claim 1, wherein the longitudinal adjustment device operates independently of the rotational adjustment device.

13. The vehicle seat according to claim 1,
wherein the electric motor defines a boundary, and
wherein the rotational adjustment device moves within the boundary.

14. The vehicle seat according to claim 1, wherein the rotational adjustment device is connected to the upper part.

15. The vehicle seat according to claim 1,
wherein a first cover plate and a second cover plate couple the rotational adjustment device to the upper part,
wherein the first cover plate is rigidly connected to the rotational adjustment device, and
wherein the second cover plate is not connected to the rotational adjustment device.

* * * * *